Dec. 29, 1964 R. C. PAULSEN ET AL 3,163,771

LOGICAL TRANSFER CIRCUIT

Filed Aug. 27, 1958

INVENTORS
ROBERT C. PAULSEN
ALLAN A. KAHN

BY
William V Schelberg
AGENT

United States Patent Office 3,163,771

Patented Dec. 29, 1964

3,163,771

LOGICAL TRANSFER CIRCUIT

Robert C. Paulsen, Poughkeepsie, and Allan A. Kahn, Bronx, N.Y., assignors to International Business Machines Corporation, New York, N.Y., a corporation of New York Filed Aug. 27, 1958, Ser. No. 757,482

12 Claims. (Cl. 307—88)

This invention relates to logical switching circuits, and more particularly to logical pulse switching circuits utilizing bistable magnetic components.

In many of the prior art switching circuits, wherein binary notation is utilized, a number of bistable components are connected in a transfer loop which includes one or more diodes to permit current flow in only one direction, while in other instances the diodes are eliminated by various circuit techniques. The output signal provided with transfer loops without diode elements may be utilized to switch another bistable component, however, when more than one bistable component is to be switched in an output loop to provide output branching from such diodeless type transfer circuits, the need for again utilizing a diode in the transfer loop in order to maintain high speeds of operation is dictated.

According to this invention, a diodeless transfer loop is provided that is adapted to perform logic on binary information and which is capable of delivering currents of sufficient magnitude to enable output branching.

It is then an object of this invention to provide a diodeless transfer circuit capable of delivering large output currents.

Another object of this invention is to provide a new and improved transfer circuit which does not necessitate the use of diodes or resistors in the transfer loop.

Another object of this invention is to provide new and improved switching circuits capable of performing logical operations on binary information.

Still another object of this invention is to provide new and improved logical switching circuits which employ magnetic bistable cores which are capable of attaining high speeds of operation.

These and other objects of this invention may be realized by constructing a circuit in accordance with this invention, wherein an input magnetic coupling core, an intermediate magnetic coupling core and a storage core are serially connected, and a plurality of output magnetic cores are serially coupled with the intermediate core. In particular, a storage magnetic core is provided with a control winding, which is adapted to act as an input and an output winding, serially connected with an output winding on the input core and an input winding, on the intermediate core. The intermediate core has an output winding serially connected with an input winding on each of a plurality of output cores. When the input core is set, the induced voltage on its output winding causes the intermediate core to be set and the voltage induced on the output winding of the intermediate core is blocked by a diode in the output loop. Upon reset of the input core, the storage core in the transfer loop is set, and immediately thereafter, both the storage and intermediate cores are reset. The control winding on the storage core and the input winding on the intermediate core are wound opposite in sense and therefore the induced voltages on these windings due to the resetting of their respective cores cancel to prevent retrograde transfer. The resetting of the storage and coupling cores may be done quickly to provide a larger magnitude of induced voltage on the output winding of the intermediate core, which winding has a relatively large number of turns, permitting each of the output coupling cores to be set and thus provide output branching. Logic is performed by biasing the input coupling core so that one or a plurality of inputs must be energized to set the core and provide an input into the transfer circuit, and in another instance the logic performed by this biasing technique is negated by providing an inhibiting input to the intermediate core.

Other objects of this invention will be pointed out in the following description and claims and illustrated in the accompanying drawings, which disclose, by way of example, the principle of the invention and the best mode, which has been contemplated, of applying that principle.

In the figures.

Figure 1:
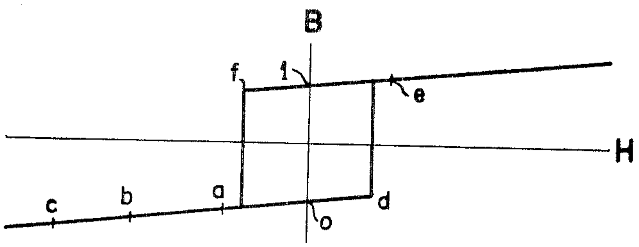
FIG. 1 is a representation of an idealized hysteresis characteristic obtained for the magnetic material herein employed.

Referring to FIG. 1, the curve illustrates a plot of flux density (B) versus applied field (H) for a magnetic core having an idealized rectangular hysteresis characteristic. The opposite remanence states are conventionally employed for representing binary information conditions and are arbitrarily designated as "0" and "1." These opposite remanence states are sometimes referred to hereinafter as bistable states of residual magnetism. When in the state indicating the binary information condition "0" a core may be characterized as being in the "datum stable state." When in the state indicating the binary information condition "1" state, the core may be characterized as being in an "information representative stable state." With a "0" stored, a pulse applied to a winding linking the core in proper sense causes the loop to be traversed and the remanence state "1" is attained when the pulse terminates. Such a pulse is hereinafter referred to as a "write" pulse. Similarly, the core is read out or returned to the "0" state in determining what information has been stored by applying a pulse in the reverse sense to the same or another winding. Such a pulse is hereinafter referred to as a "read" pulse. Should a "1" have been stored, a large flux change occurs with the shift from "1" to "0" conditions with a corresponding voltage magnitude developed on the output winding. On the other hand, should a "0" have been stored, little flux change occurs and negligible signal is developed on the output winding.

A dot is shown adjacent one terminal of each of the windings indicating its winding direction. A write pulse is a positive pulse which is directed into the undotted winding terminal which tends to store a "1," while a read pulse is a positive pulse directed into the dotted terminal and tends to apply a negative magneto-motive force, or store a "0."

The arrangements disclosed employ input and output coupling magnetic cores arranged intermediate to so called storage cores which store certain logical information. These arrangements are adapted to be interconnected with each other and with similar type circuitry through such coupling cores. The coupling cores may be fabricated of ferrite materials like the storage or memory cores, however it is not essential that these cores exhibit the rectangular hysteresis characteristic required of the storage cores, but should have a good $Br/Bs$ ratio, as these devices function as variable impedance elements in controlling the transfer of information pulses, as will be more evident from the following description. Such interconnecting coupling cores are illustrated in the circuits and are labeled $C_1$, $C_2$, $C_3$, $C_4$ and $C_5$ for clarity.

Also shown are storage cores labeled S which are adapted to store information received. The cores S are adapted to deliver information received through the coupling core $C_2$, to the cores $C_3$, $C_4$ and $C_5$ to provide output branching.

Referring now to the FIG. 2 in detail, the core S is provided with a control winding 10, which is adapted to act as both input and output winding, interconnected with an output winding 12 on the core $C_1$, and an input winding 14 on the core $C_2$, which interconnection will hereinafter be referred to as loop A. Inputs are applied to the circuit by means of an input winding 16, on the core $C_1$ connected with a source X, and input winding 18 on the core $C_1$ connected with a source Y, and an input winding 20 on the core $C_1$ connected with a source Z, while outputs are obtained from the circuit by means of an output winding 24 on the core $C_2$ which is interconnected with an input winding 26 on the core $C_3$, an input winding 28 on the core $C_4$ and an input winding 30 on the core $C_5$ through a diode D, which interconnection will hereinafter be referred to as loop B. Each of the cores $C_3$, $C_4$ and $C_5$ have an output winding 32, 34 and 36, respectively, which provide an output signal when the cores are switched from one bistable state to another. The core $C_1$ is energized from an adjustable direct current source I D.C., the cores $C_2$, $C_3$, $C_4$ and $C_5$ are energized by a clock pulse source $I_A$ and the cores S and $C_2$ are energized from a clock pulse source $I_B$. A winding 38 is provided on the core $C_1$, connected with the source I D.C., a winding 40 is provided on the core S and a winding 42 on the core $C_2$ connected with the source $I_B$, while a winding 44 is provided on the core $C_2$ series connected with a winding 46 on the core $C_3$, a winding 48 on the core $C_4$ and a winding 50 on the core $C_5$ which windings are connected with the source $I_A$.

Figures 2, 3, 4:
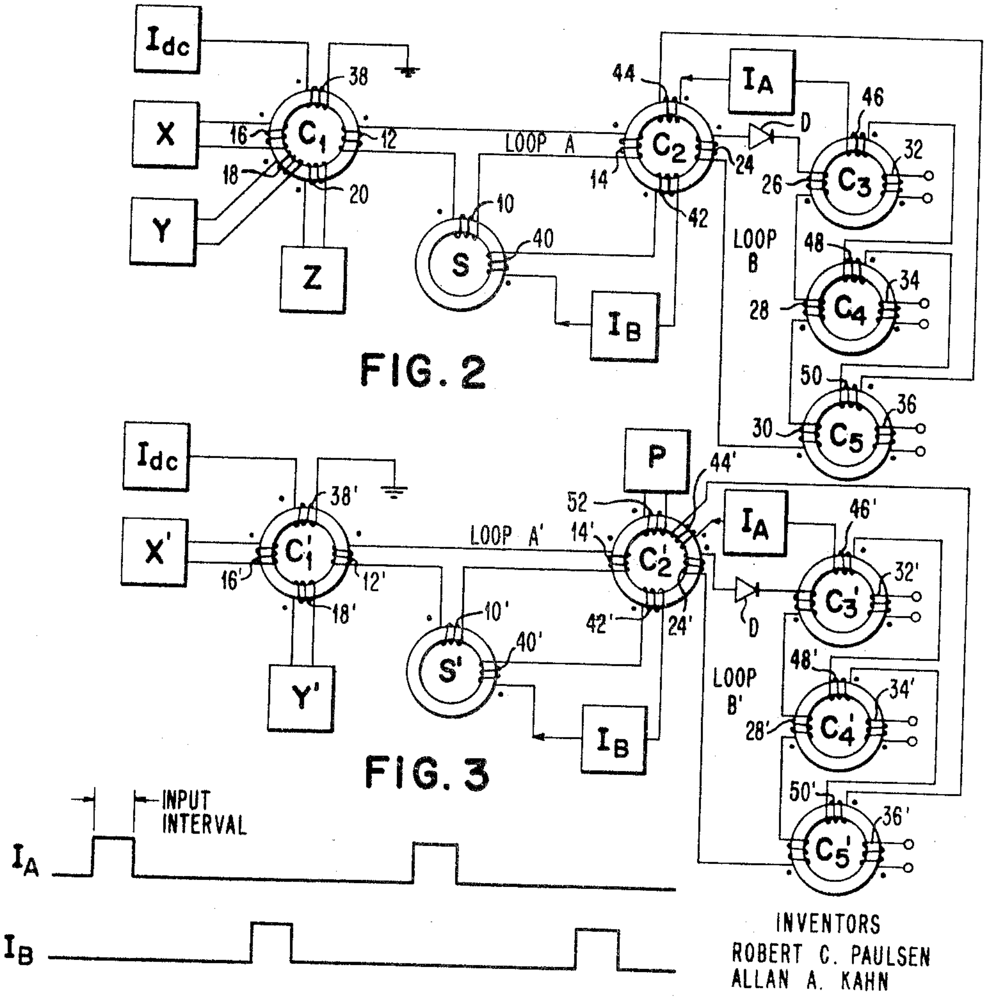
FIG. 2 is a circuit diagram illustrating one embodiment of this invention.
FIG. 3 is a circuit diagram illustrating another embodiment of this invention.
FIG. 4 shows the relative timing of current pulses which are required for operation of the circuits disclosed in the FIGS. 2 and 3.

The sequence of pulses provided by the clock pulse sources $I_A$ and $I_B$ described above is as indicated in the FIG. 4 with the time of appearance of an input signal, which is a positive signal directed into the undotted end of an input winding, shown to be the time at which the $I_A$ clock pulse source operates, and these sources are adapted to operate with the circuits shown in the FIGS. 2 and 3.

Referring to the FIG. 1, various points along the magnetization curve are shown and labeled *"a," "b," "c," "d," "e"* and *"f."* Referring to the FIGS. 2 and 3, the coupling cores $C_1$ and $C_1'$ each have a winding 38 and 38', respectively, to which the source I D.C. is connected. The point *"a"* on the magnetization curve of FIG. 1 may be referred to as one unit of bias, the point *"b"* as two units of bias and the point *"c"* as three units of bias applied to the cores $C_1$ or $C_1'$ by the source I D.C. connected with the winding 38 or 38', respectively. With one unit of bias applied, a single input signal switches the core along the *"a," "d,"* and *"e"* portion of the curve to cause a large amount of flux change, and upon termination of the input signal, the bias returns the core from point *"e"* to point *"f"* back to point *"a"* to reset the core. With two units of bias applied, the core operates at point *"b,"* and a single input removes the operating point from *"b"* to *"a"* causing little or no flux change, while two input signals cause switching to the point *"e."* With three units of bias applied, three inputs are necessary to cause switching from point *"c"* to point *"e."*

Referring again to FIG. 2, assume all cores are in the lower remanence condition or in the "0" residual state. Further, consider the core $C_1$ with only the input winding 16 present and the windings 18 and 20 removed and that one unit of bias is applied to the core $C_1$ as shown by the point *"a"* in the FIG. 1. Considering the circuit in the absence of an input, the source $I_B$ directs a read signal into the windings 40 and 42 on the cores S and $C_2$, respectively, which has no effect since both cores are already in the "0" state, and the source I D.C. which is biasing the core $C_1$ in the read direction to point *"a"* has no effect since the core $C_1$ is also in the "0" state. While similarly, upon termination of the $I_B$ clock pulse the $I_A$ clock pulse source operates to direct a read signal into the windings 44, 46, 48 and 50 on the cores $C_2$, $C_3$, $C_4$ and $C_5$, respectively, which has no effect since these cores are already in the "0" state.

Assume the source X is actuated to direct an input into the winding 16 on the core $C_1$. Due to this input, the core $C_1$, switches from the point *"a"* toward the point *"e"* on the magnetization curve shown in FIG. 1. The core $C_1$ in switching induces a voltage on the winding 12 with the undotted end positive causing a counter-clockwise current flow in the loop A which tends to read the core S and write the core $C_2$. Since the core S is already in the "0" state it is uneffected, while the core $C_2$ is switched from the "0" to the "1" state to induce a voltage on the output winding 24 on the core $C_2$ with the undotted end positive. The voltage induced on the winding 24 tends to cause a counter-clockwise current flow in the loop B which is blocked and its energy dissipated by the diode D. Upon termination of the input signal into the winding 16 on the core $C_1$, the direct current bias applied to the core $C_1$ by the source I D.C. returns the core $C_1$ from the point *"e"* to the point *"a"* on the magnetization curve. The core $C_1$ in being reset from the "1" to the biased "0" state induces a voltage on the output winding 12 with the dotted end positive causing a clockwise current flow in the loop A which tends to read the core $C_2$ and write the core S. Since the control winding 10 on the core S has a greater number of turns in comparison with the winding 14 on the core $C_2$, the core S is switched from the "0" to the "1" state and the core $C_2$ remains in the "1" state. Subsequently, the $I_B$ clock pulse source directs a read signal into the windings 40 and 42 on the cores S and $C_2$, respectively, which resets the cores S and $C_2$ from the "1" to the "0" state. The core S in being reset induces a voltage on the control winding 10 with the dotted end positive while the core $C_2$ in being reset induces a voltage on the windings 14 and 24 with their dotted end positive. The algebraic sum of the voltages induced on the windings 10 and 14 on the cores S and $C_2$, respectively, is effectively zero and little current flows in the loop A, while the voltage induced in the winding 24 on the core $C_2$ causes a clockwise current flow in the loop B which passes through the diode D in the forward direction and directs a write signal into the windings 26, 28 and 30 on the cores $C_3$, $C_4$ and $C_5$, respectively, causing each of the cores to switch from the "0" to the "1" state inducing a voltage on the output windings 32, 34 and 36, respectively. After termination of the $I_B$ clock pulse, the $I_A$ clock pulse source operates to direct a read signal into the windings 44, 46, 48 and 50 on the cores $C_2$, $C_3$, $C_4$ and $C_5$ respectively, which resets the cores $C_3$, $C_4$ and $C_5$ from the "1" to the "0" state causing a voltage to be induced on the windings 26, 28 and 30, on the cores $C_3$, $C_4$ and $C_5$, respectively, with their dotted ends positive. The induced voltages are additive and cause a clockwise current in loop B which tends to write the core $C_2$ having no effect, since the core $C_2$ is held in the "0" state by the $I_A$ pulse applied to its winding 44. Thus, at the conclusion of the $I_A$ and $I_B$ clock pulses, all cores are left in the "0" state and an output signal has been engendered upon initial application of an input to accomplish output branching of the information transferred.

Consider, in the circuit shown in FIG. 2, only presence of the windings 16 and 18 on the core $C_1$ with their associated sources, and that the source I D.C. applies two units of bias to the core $C_1$, as indicated by the point *"b"* in the FIG. 1. For any one input, actuation of the sources X or Y independently, the core $C_1$ will remain in the "0" state and the circuit will behave as if no input were applied as described above. When both the X and Y input sources are actuated to direct an input signal in the undotted ends of the windings 16 and 18, respectively, the core $C_1$ switches from the point *"b"* to the point *"e"* to induce a voltage in the winding 12 with the undotted end positive, and the circuit thereafter functions tion therefore, to be limited only as indicated by the scope of the following claims.

What is claimed is:

1. A logical information handling device comprising, a storage magnetic core, control winding means on said storage core, an input coupling core and an intermediate coupling core, input and output winding means on each of said coupling cores, each of said storage and coupling cores being capable of attaining bistable states of residual flux density, circuit means consisting of the output winding means on said input coupling core connected with the control winding means on said storage core in one sense and connected with said input winding means on said intermediate coupling core in an opposite sense in a closed series loop, a first signal means operably connected with the input winding means on said input coupling core, said intermediate coupling core having a second input winding means and a second signal means operably connected thereto, biasing means for biasing said input coupling core in a datum stable state, said first signal means being selectively operable to jointly cause said input coupling core to switch to an information representative stable state and to set said intermediate coupling core to said information representative stable state, said biasing means thereafter jointly resetting said input coupling core to said datum stable state and setting said storage core to said information representative stable state, and means for thereafter establishing said storage and intermediate coupling cores in said datum stable state simultaneously.

2. A device as set forth in claim 1, wherein said second input winding means on said intermediate coupling core inhibits said intermediate coupling core from switching to said information representative bistable state when energized by said second signal means.

3. A device as set forth in claim 2 wherein said biasing means comprises a further winding on said input coupling core connected with a direct current source.

4. A logical transfer circuit comprising an intermediate magnetic core having an input winding and a storage magnetic core having a control winding, said windings being connected in series, one of said windings requiring a higher current than the other in said series circuit for switching the associated cores to a different remanence state, means connected and arranged for simultaneously placing said cores each in a first remanence state, input means connected to supply a pulse of current to said series connected windings having a direction and magnitude sufficient to switch the core requiring the higher switching current to a second remanence state, said windings being connected so that said current pulse is in a direction in the winding of said other core to maintain said other core in said first remanence state, said input means including means to thereafter supply an opposite current sufficient to switch said other core to a second remanence state but insufficient to switch said core requiring the higher switching current from said second state to said first state, said input means comprising an input core having an output winding connected to form a series closed loop with said series connected windings, said series closed loop consisting only of said output winding and said series connected windings, said series connected windings being operative to generate voltages in opposition to one another during said simultaneous placing of said cores in said first remanence state so that each prevents the other from causing any change in the remanence state of said input core, and load means associated with said intermediate core for receiving an output signal therefrom during said simultaneous operation.

5. A logical information handling device comprising, a storage magnetic core, an input magnetic coupling core and an intermediate magnetic coupling core, each of said cores being capable of attaining bistable states of residual flux density, a control winding on said storage core, input and output windings on each of said coupling cores, a series circuit consisting of said input coupling core output winding and said storage core control winding and said intermediate core input winding connected in a closed series loop, information signal means connected for energizing said input coupling core input winding to set said input and said intermediate coupling cores to an information representative stable state, said control winding of said storage core being connected in opposite sense to prevent setting thereof to an information representative stable state in response to said information signal means, means for thereafter switching said input coupling core to a datum stable state at a slower switching rate providing a current in said series loop sufficient to set said storage core to said information representative stable state, said slower switching rate current being insufficient to switch said intermediate core to a datum stable state, and further means for simultaneously switching said intermediate and storage cores to said datum stable state, and load means connected to said intermediate core output winding to receive an output signal during said simultaneous switching.

6. A logical information handling circuit comprising, a storage magnetic core having a control winding, an input coupling core and an intermediate coupling core each having input and output windings, each of said cores being capable of attaining bistable states of residual flux density, a series circuit consisting of said input coupling core output winding connected in series with said storage core winding in one sense and with said intermediate coupling core input winding in an opposite sense in a closed series loop, signal means operably connected with said input coupling core input winding, biasing means for biasing said input coupling core in a datum stable state, said signal means being selectively operable to overcome said biasing means to cause said input coupling core to switch to an information representative stable state generating a signal in said series connected windings operable to switch said intermediate coupling core to said information representative stable state, said biasing means being thereafter effective to reset said input coupling core to said datum stable state generating an opposite signal of lesser magnitude in said series connected windings operable to switch said storage core to said information representative stable state without switching said intermediate core, and means for thereafter establishing said storage and intermediate coupling cores in said datum stable state simultaneously, and load means connected to said intermediate core output winding to receive an output signal during said simultaneous switching.

7. A logical information handling circuit comprising, a storage magnetic core having a control winding, an input coupling core and an intermediate coupling core each having input and output windings, each of said cores being capable of attaining bistable states of residual flux density, a series circuit consisting of said input coupling core output winding connected in series with said storage core winding in one sense and with said intermediate coupling core input winding in an opposite sense in a closed series loop, signal means operably connected with said input coupling core input winding, biasing means for biasing said input coupling core in a datum stable state, said signal means being selectively operable to overcome said biasing means to cause said input coupling core to switch to an information representative stable state generating a signal in said series connected windings operable to switch said intermediate coupling core to said information representative stable state, said biasing means being thereafter effective to reset said input coupling core to said datum stable state generating an opposite signal of lesser magnitude in said series connected windings operable to switch said storage core to said information representative stable state without switching said intermediate core, and means for thereafter establishing said storage and intermediate coupling cores in said datum stable state simultaneously, and a plurality of output cores having similarly as described above when an input was present and only one input winding was considered. If, the I D.C. bias, in the latter described circuit, were such that the core $C_1$ had one unit of bias applied, the point "*a*" in the FIG. 1, then any one of the input sources X or Y, when actuated separately, or in coincidence, would switch the core $C_1$. When we consider the circuit with all three input windings 16, 18 and 20 on the core $C_1$, as is shown in the FIG. 2, then, if the core $C_1$ is biased to the point "*a*" any one input X, Y or Z will cause the core $C_1$ to switch to the "1" state, while if the core $C_1$ were to have two units of bias applied, point "*b*," then two input sources, when actuated coincidently, are needed to switch the core $C_1$, and with the core $C_1$ having three units of bias applied, point "*c*," the three inputs X, Y and Z are necessary to switch the core $C_1$ from the point "*c*" to the point "*e*."

With reference to the FIG. 3, another embodiment of this invention is shown wherein each of the elements appearing in the FIG. 2 are primed and similarly connected, except for the input source Z, shown connected with the winding 20 on the core $C_1$ in the FIG. 2 eliminated, and with the inclusion of a winding 52 on the core $C_2'$ connected with an input source P.

Again, consider all the cores as being in the "0" state and the core $C_1'$ as having one unit of bias applied. Any one of the input sources, X′ or Y′, when actuated, will cause the core $C_1'$ to switch from the point "*a*" to the point "*e*," thus inducing a voltage on the output winding 12′ on the core $C_1'$, and operation of the circuit is similar as above described for the FIG. 2, with an output engendered upon reset of the core $C_2'$ by the $I_B$ clock pulse. Consider however, the circuit operation when the source P is actuated simultaneously with any one of the inputs X′ or Y′. As the core $C_1$ is switched from the point "*a*" to the point "*e*" on the magnetization curve, a voltage is induced in the winding 12′ on the core $C_1'$ with the undotted end positive causing a counter-clockwise current flow in loop A′ which tends to read the core S′ and write the core $C_2'$. Since the core S′ is already in the "0" state it is unaffected. Simultaneously, the input source P is directing a positive signal into the dotted end of the winding 52 which negates the effect of the current in loop A directed into the undotted end of the winding 14′ on the core $C_2'$. The core $C_2'$ remains in the "0" state and upon termination of the input signals X′, and/or Y′ and P, the bias applied to the core $C_1'$ resets the core $C_1'$ to the point "*a*" and in so doing induces a voltage in the output winding 12′ with its dotted end positive to cause a clockwise current flow in loop A′ which tends to write the core S′ and read the core $C_2'$. Due to the greater number of turns in the winding 10′ on the core S′ as compared with the number of turns in the winding 14′ on the core $C_2'$ the core S′ is switched from the "0" to the "1" state. Subsequently, the $I_B$ clock pulse source directs a read signal into the windings 40′ and 42′ on the cores S′ and $C_2'$, respectively, which resets the core S′ from the "1" to the "0" state. The core S′ in being reset to the "0" state induces a voltage on the winding 10′ with the dotted end positive causing a clockwise current in the loop A′ which tends to write the core $C_1'$ and read the core $C_2'$. Since the core $C_2'$ is already in the "0" state and is also biased by the $I_B$ drive applied to the winding 42′, it is unaffected. The core $C_1'$ is biased by the I D.C. drive applied to the winding 38′ and therefore is likewise unaffected, and all cores, upon termination of the $I_B$ clock pulse, are left in the "0" state, with the further application of the $I_A$ clock pulse having no effect since the cores $C_2$, $C_3$, $C_4$ and $C_5$ are driven toward the "0" state by this clock pulse.

Larger units of bias may be applied to the core $C_1'$ which will necessitate a greater number of inputs to switch the core $C_1'$ and allow performance of other logical operations. Further, in each of the circuits described, any one of the inputs could be made a clock input by connecting the input winding, say 18 or 18′ to a clock pulse source operable at the same interval as $I_A$ which would cause the core $C_1'$ to switch to the "1" state in every cycle of operation. Further versatility may be accomplished by winding the input windings on the core $C_1$ or $C_1'$ in aiding or opposing relationship.

In order to fully appreciate the logical operations which may be realized by sophistication of the input windings, altering the bias, or providing a different number of input windings to the core C or $C_1'$ in the FIG. 2 and FIG. 3, some of the various operators are described below.

With reference to the FIG. 2, consider one unit of bias applied to the core $C_1$ and a single input, say X, connected thereto, the circuit then accomplishes the transfer, or delay function. With one unit of bias applied to the core $C_1$ and two inputs X and R applied, a two-way OR function is realized. With one unit of bias applied to the core $C_1$ and the inputs X and Y connected thereto but with the windings 16 and 18 wound in opposite sense, the function of NOT IF THEN is accomplished. If, in the latter winding arrangement, one of the input windings were connected to be pulsed at the interval $I_A$ so that the core $C_1$ is switched every cycle from point "*a*" to point "*e*" on the magnetization curve then, with the other input wound to oppose this flux change, the logical operation of Inversion, or "complementing," is performed. By applying two units of bias to the core $C_1$ and having two inputs connected thereto, say X and Y, as is shown in the FIG. 2, then the logical operation of AND is performed. From the foregoing discussion it may well be realized that further input windings with other clock sources may be applied with sophistication of the input windings so that similar ternary logic may be performed such as the three-way AND circuit described.

With reference to the FIG. 3, similar operations, as may be performed in the arrangement of FIG. 2, may be realized, with a further control, namely, the inhibiting P input to the core $C_2'$ which acts to negate any logic performed.

In the interest of providing a complete disclosure details of one embodiment of the logical device wherein magnetic cores are employed is given below, however, it is to be understood that other component values and current magnitudes may be employed with satisfactory operation attained so that the values given should not be considered limiting.

With the clock pulse currents $I_A$ and $I_B$ delivering a constant current of 1.8 amperes, the windings 46, 48 and 50 may comprise two turns, the windings 40 and 42 may comprise five turns, and when the winding 18′ is to be connected with the $I_A$ clock pulse source it may comprise two turns. The biasing winding 38 may comprise eight turns and the I D.C. current source may be adjusted to deliver a constant current of 250, 500 or 750 milliamperes when either one, two or three units of bias, respectively, is to be applied. In the coupling circuits interconnecting the storage and coupling cores, the windings 10 and 12 may comprise six turns and the windings 14, 26, 28 and 30 may comprise five turns, while the input windings 16, 18 and 20, when not connected to one of the clock pulse sources, may comprise five turns and the output winding 24 may comprise twenty turns with the diode D having the characteristics exhibited by the IN270 diode manufactured by the Transitron Company.

Each of the storage and coupling cores may comprise toroids of magnesium-manganese ferrite composition having an outside diameter of 0.115 inch, inside diameter of 0.080 inch and a thickness of 0.055 inch.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the inteninput windings connected in a closed series loop with said intermediate core output winding and operable to receive a switching signal during said simultaneous switching.

8. A logical information handling device comprising, a storage magnetic core, an input magnetic coupling core and an intermediate magnetic coupling core, each of said cores being capable of attaining bistable states of residual flux density, control winding means on said storage core, input and output winding means on each of said coupling cores, circuit means consisting of the output winding means on said input coupling core and the control winding means on said storage core and the input winding means on said intermediate core connected in a closed series loop, information signal means for energizing the input winding means on said input coupling core and setting said input and said intermediate coupling cores to an information representative stable state, means for thereafter establishing said input coupling core in a datum stable state and setting said storage core to said information representative stable state, and further means for simultaneously establishing said intermediate and storage cores in said datum stable state.

9. A device as set forth in claim 8, including an asymmetrical impedance device serially connected with the output winding means on said intermediate coupling core.

10. A logical information handling device providing output branching comprising, a storage magnetic core, an input, an intermediate and a plurality of output magnetic coupling cores, each of said cores being capable of attaining bistable states of residual magnetization, control winding means on said storage core, input and output winding means on each of said coupling cores, circuit means consisting of the output winding means on said input coupling core connected with said control winding means in one sense and connected with the input winding means on said intermediate coupling core in an opposite sense in a closed series loop, further circuit means including an asymmetrical impedance device connecting the output winding means on said intermediate core with the input winding means of said output coupling cores, information signal means for energizing the input winding means on said input coupling core whereupon said intermediate core is set to an information representative bistable state, a first means for jointly establishing said input core in a datum bistable state and setting said storage core to said information representing bistable state, a second means for simultaneously establishing such storage and intermediate core in said datum bistable state whereby said output coupling cores are set to said information representative bistable state, and a third means for establishing said output cores in said datum bistable state.

11. A device as set forth in claim 10 including a further input winding means on said intermediate coupling core adapted to inhibit said intermediate coupling core from being set to said information representative bistable state when energized.

12. A device as set forth in claim 10 wherein said first, second and third means are actuated in sequence in the order named.

References Cited in the file of this patent

UNITED STATES PATENTS

| | | |
|---|---|---|
| 2,850,722 | Loev | Sept. 2, 1958 |
| 2,904,779 | Russell | Sept. 15, 1959 |
| 2,935,735 | Kodis et al. | May 3, 1960 |
| 2,940,067 | Shelman | June 7, 1960 |
| 2,985,868 | Kauffmann et al. | May 23, 1961 |